United States Patent [19]
Trunz et al.

[11] Patent Number: 6,111,691
[45] Date of Patent: Aug. 29, 2000

[54] POSITIONING TABLE

[75] Inventors: Michael Trunz, Ellwangen; Bernhard Trier, Germering, both of Germany

[73] Assignee: Carl-Zeiss-Stiftung, Heidenheim, Germany

[21] Appl. No.: 09/215,318

[22] Filed: Dec. 18, 1998

[30] Foreign Application Priority Data

Dec. 23, 1997 [DE] Germany ............... 197 57 529

[51] Int. Cl.[7] .......................... G02B 21/01; G02B 21/26; G02B 5/08
[52] U.S. Cl. .................. 359/398; 359/391; 359/848
[58] Field of Search .................. 359/368, 391–398, 359/846–848; 52/393, 573

[56] References Cited

U.S. PATENT DOCUMENTS

| | | | |
|---|---|---|---|
| 4,231,660 | 11/1980 | Remy et al. | 359/398 |
| 4,441,793 | 4/1984 | Elkins | 359/398 |
| 4,526,445 | 7/1985 | Wogoman | 359/398 |
| 4,722,598 | 2/1988 | Ford | 359/398 |
| 4,826,303 | 5/1989 | Meier | 359/848 |
| 5,262,220 | 11/1993 | Spriggs et al. | 428/156 |

FOREIGN PATENT DOCUMENTS

| | | |
|---|---|---|
| 3934546 | 4/1991 | Germany . |
| 196 01 018 | 8/1996 | Germany . |
| 196 50 392 | 2/1998 | Germany . |

*Primary Examiner*—Thong Nguyen
*Attorney, Agent, or Firm*—Walter Ottesen

[57] ABSTRACT

A structure includes a cover body having a plate-like shape and a support body of open light-weight structure composed of struts, connecting nodes and support points. Attachment locations are spatially separated one from the other and the cover body and the support body are bonded at these locations.

11 Claims, 5 Drawing Sheets

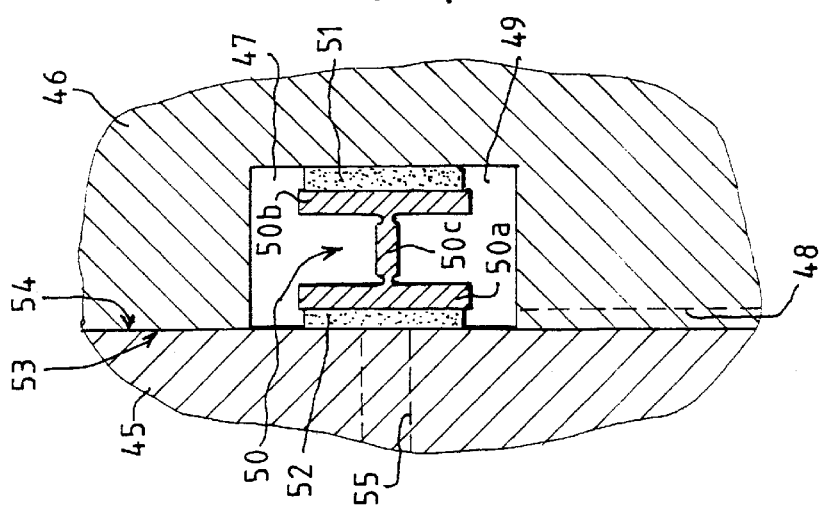
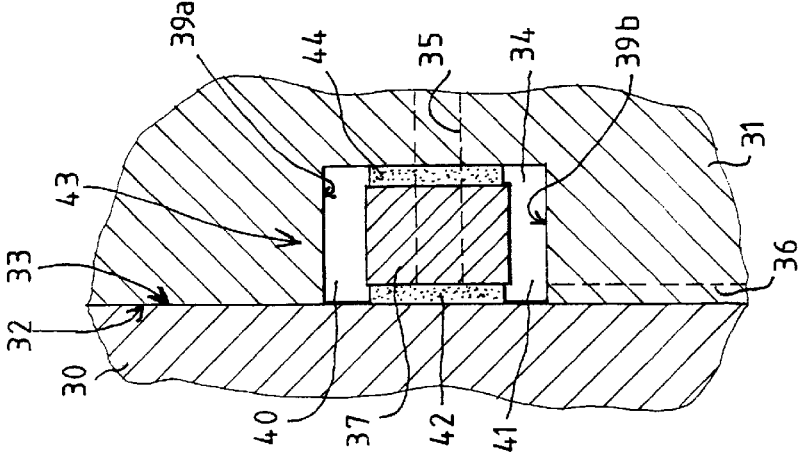

POSITIONING TABLE

FIELD OF THE INVENTION

The invention relates to a positioning table having at least a supporting body made at least of a first material which has a plurality of recesses.

BACKGROUND OF THE INVENTION

For certain applications, a positioning table (preferably at mirrored surfaces, on measuring surfaces or on support surfaces for other components) should exhibit only minimal deformations after manufacture wherein the permitted deformation range is permitted to lie in the nanometer region. The above applications are especially in the manufacture of larger bodies made of several individual bodies which comprise especially silicate or ceramic.

It is not only the size and weight of the positioning table which is relevant but especially also its form and its vibration characteristic (especially at inner edges). The application of this positioning table preferably takes place in regions in which nanometer differences are relevant sizes such as in microscopy, astronomy, et cetera.

Essentially two methods are known in the state of the art of fine assembly technology for joining two bodies tightly to each other. These methods are presented as (a) and (b) below.

(a) When bodies are wrung to each other, optical surfaces are joined to each other via the van der Waal forces. Wringing is primarily used for force-tight temporary connections in manufacture. It is a disadvantage in this method that the two bodies joined by wringing easily separate because of liquids which wet the connecting edges.

Wringing is also not necessarily resistant to vibrations.

In production, wringing is used as a permanent connection for small optical elements having dimensions in the millimeter range. Large elements having dimensions in the centimeter range cannot be joined in this manner with the reliability required for a permanent connection.

Wringing can be improved and be made more reliable by means of a holding lacquer and/or an adhesive material outside of the wringing surfaces in order to increase the durability of the connection. However, the connection cannot be perfected.

(b) When applying adhesive in the absence of tension, the adhesive locations are usually optimized by a clever configuration of the adhesive locations (optimization of the adhesive gap and the adhesive pads). With this optimization, basic requirements (adhesive gap in the range from 1/10 mm to 3/10 mm, pads smaller than or equal to 6×6 mm) are considered in accordance with the state of the art.

Glued parts have the significant disadvantage that a force-tight and form-tight connection is not necessarily possible. The unavoidable creeping of the connection and the maladjustment of the parts to each other caused thereby likewise generates corresponding problems in some applications.

U.S. Pat. No. 4,826,303 discloses an arrangement for connecting at least two bodies with the bodies being connected to each other via a wedge-shaped connecting member without thermal constraining forces occurring. This arrangement has the disadvantage that both bodies have to be reworked after being joined because the wedge-shaped connecting member generates intense forces at the connecting surfaces. On the other hand, this connection is very stable.

German patent publication 3,934,546 shows an arrangement for adhesive-connecting two bodies by means of an intermediate piece. The intermediate piece is placed up to the surfaces of the two bodies and the surface cannot be used in those regions.

Further assembly techniques, such as welding, soldering, et cetera, are only suitable with great reservation as fine assembly techniques.

SUMMARY OF THE INVENTION

It is an object of the invention to provide a weight-reduced positioning table which makes possible an adjustment of its vibration characteristic with high resistance to bending.

The positioning table of the invention includes: a support body made of at least a first material; the support body having a plurality of recesses therein; and, a cover plate attached to the support body and being made of a second material.

A combination of the two requirements of flexural strength and adjustable vibration characteristic is unusual because, in the normal case, either the one or the other is wanted. Joining techniques known to the state of the art and especially fine assembly techniques cannot solve this problem which occurs only when one has to consider differences in the nanometer region.

With the invention, it is possible to produce a positioning table having large dimensions, that is, larger than 10 cm wherein both flexural strength as well as its vibration characteristic can be adapted. Experiments have been conducted wherein the surfaces, which were to be joined, had an expansion in the longitudinal direction of more than 40 cm.

The positioning table is especially suitable in optical apparatus which operate at low wavelengths because of the low deformation of the table. With respect to a positioning table, a movable table is intended which can execute movements along the X-axis and/or the Y-axis and sometimes also along the Z-axis. Such positioning tables are especially needed in microscopy or in projection exposure apparatus and especially in apparatus having main wavelengths in the ultraviolet range which lie below 400 nm.

BRIEF DESCRIPTION OF THE DRAWINGS

The invention will now be described with reference to the drawings wherein:

FIG. 8 is a first embodiment of the adhesive location according to the invention having a compensating element;

FIG. 9 is a modification of the first embodiment of the adhesive location according to a feature of the invention; and, FIG. 10 is a second embodiment of the adhesive location according to a feature of the invention wherein the adhesive location has a compensating element.

DESCRIPTION OF THE PREFERRED EMBODIMENTS OF THE INVENTION

Figure 1:
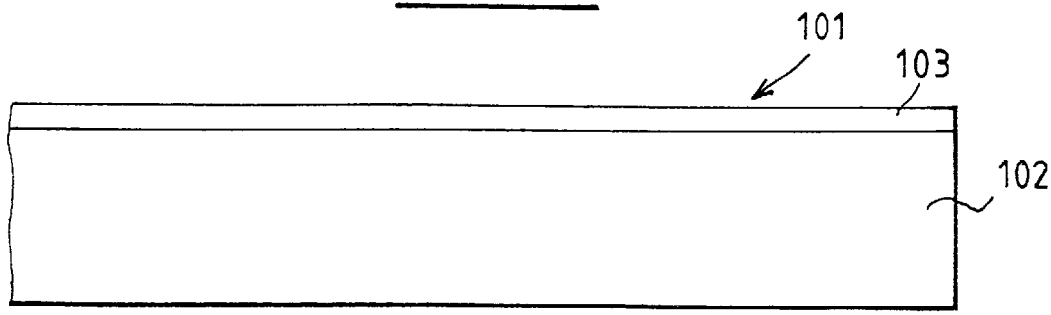
FIG. 1 is a side elevation view of a positioning table according to an embodiment of the invention.
Figure 2:
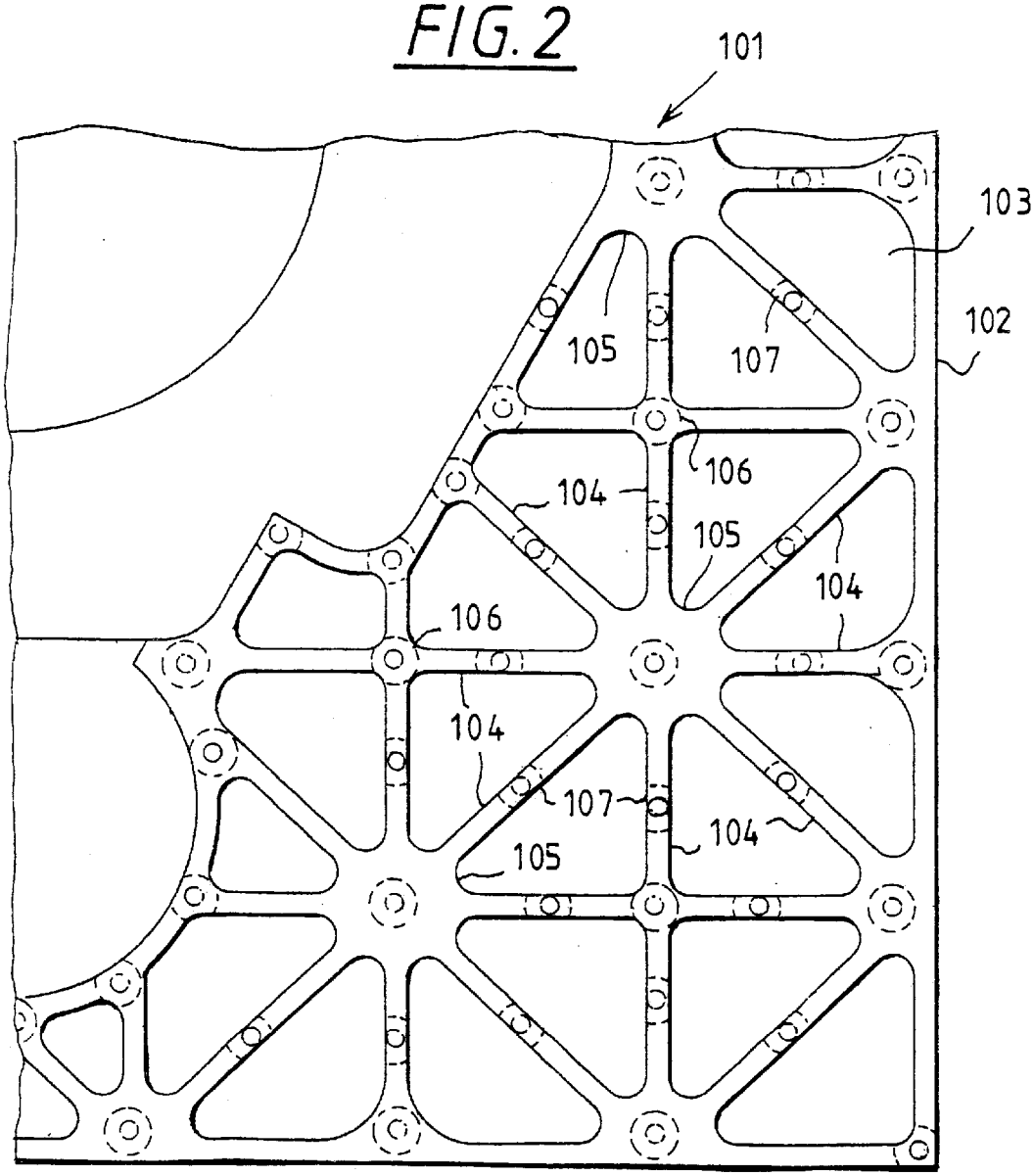
FIG. 2 is a plan view from below of the positioning table of FIG. 1.

The positioning table 101 shown in FIGS. 1 and 2 includes essentially a support body 102 having a top plate 103 attached thereto. The two bodies (102, 103) are made of one and the same material. Appropriate materials include especially silicate, ceramics (such as Zerodur) and special metals (such as Invar) having a low thermal coefficient of expansion.

The support body 102 has a lightweight structure so that the table 101 has a largest possible dynamic and can be subjected to especially high positive and negative acceleration forces. The struts 104 are arranged between the connecting nodes 105 and the support points 106 in order to obtain a high stiffness of the positioning table especially in the direction of these axes notwithstanding the lightweight structure.

Figure 3:
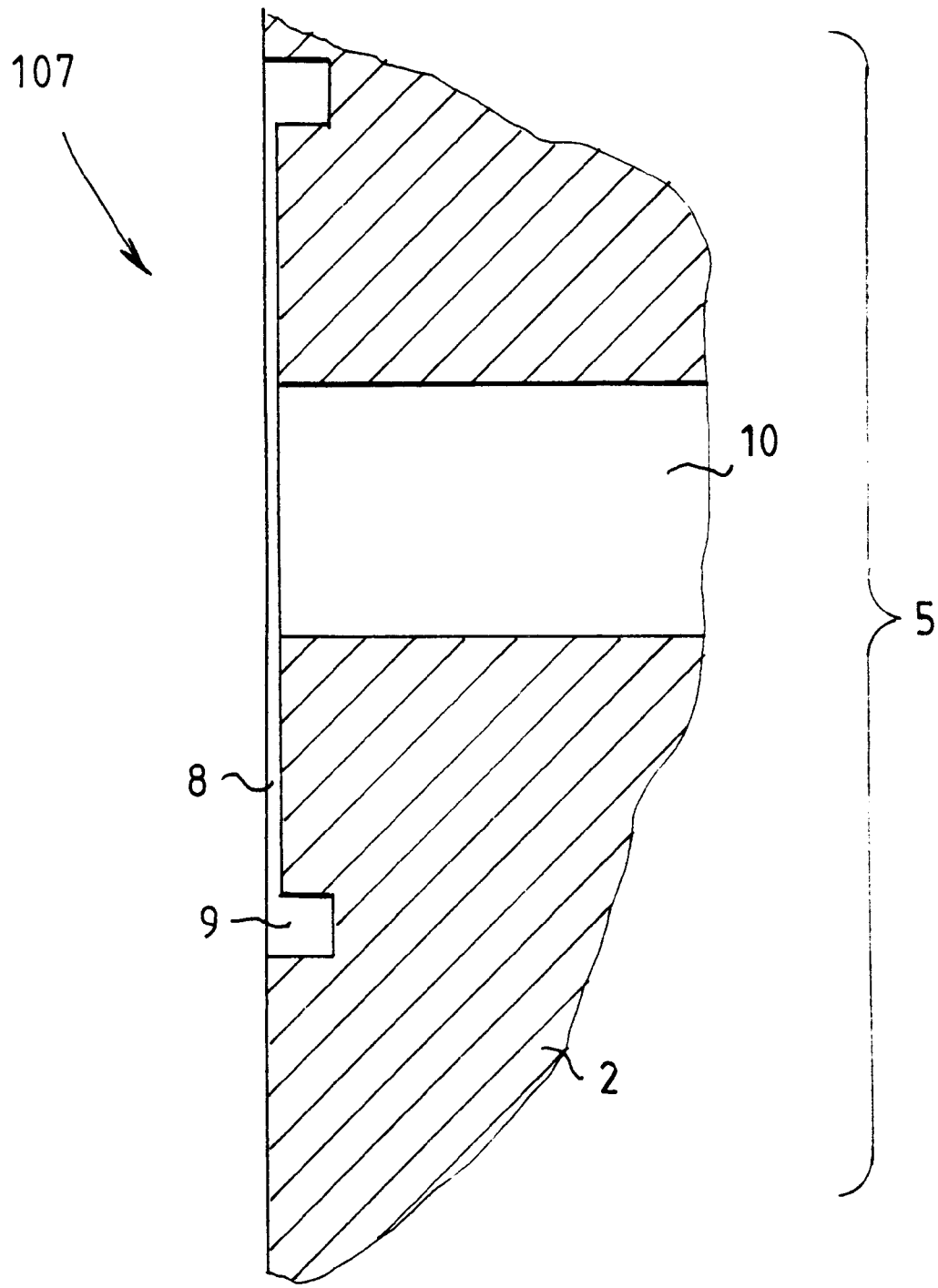
FIG. 3 is a detail view of an adhesive location on the positioning table shown in FIGS. 1 and 2.
Figure 4:
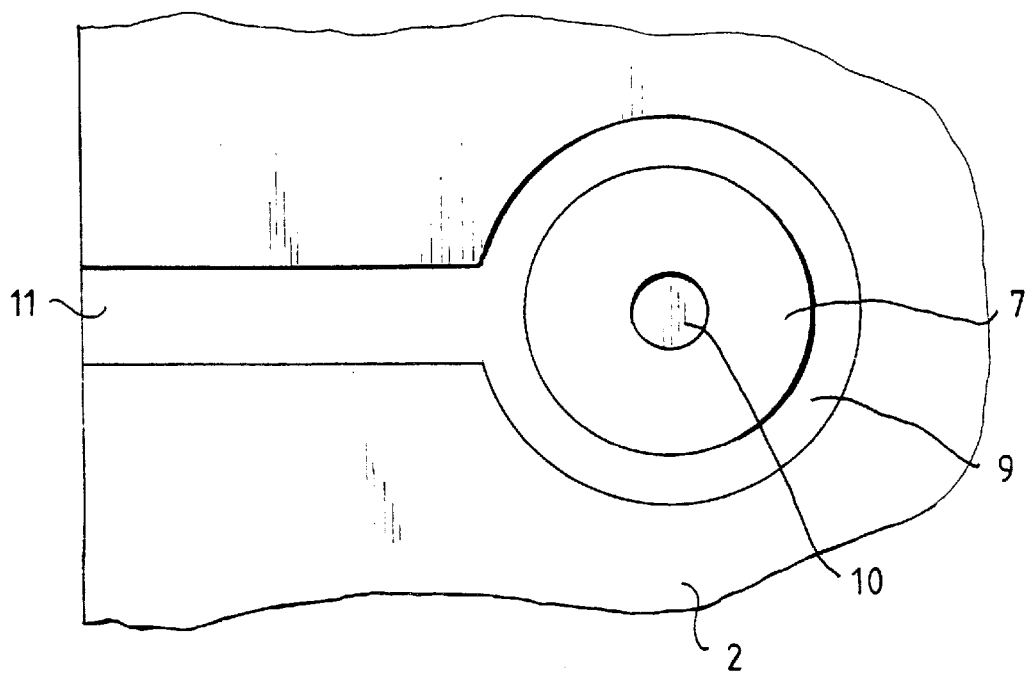
FIG. 4 is a plan view of the adhesive location.
Figure 5:
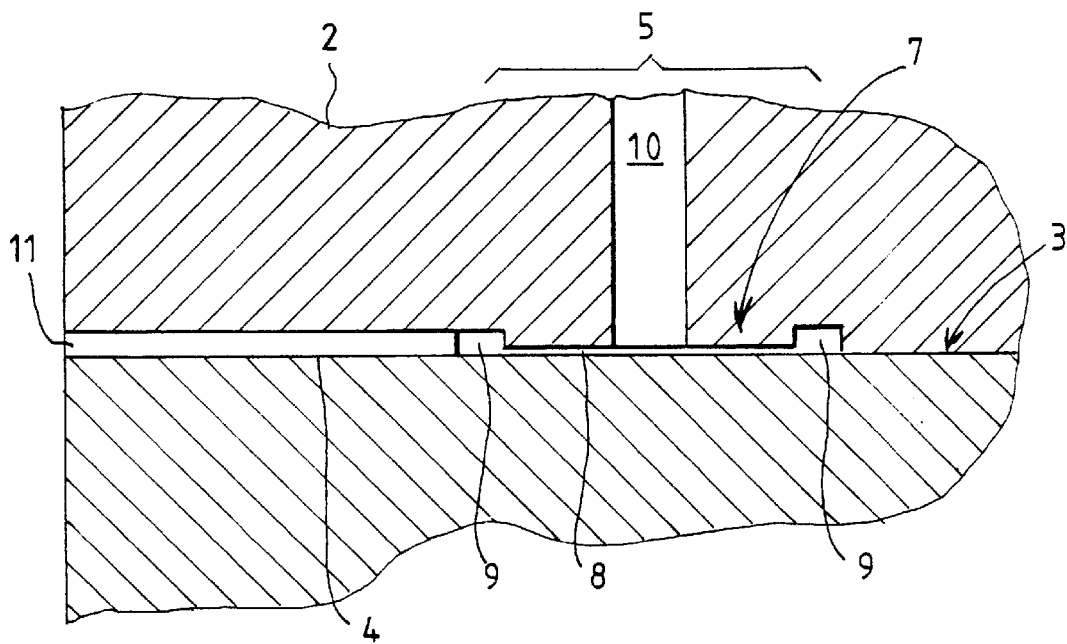
FIG. 5 is a lateral section view taken through the adhesive location.

Adhesive locations 107 are prepared on the struts 104, joining nodes 105 and support points 106. The cover plate 103 is attached to the support body 102 at the adhesive locations 107 via gluing. The specific configuration of these adhesive locations 107 is explained again with respect to FIG. 3 below.

The bending stiffness of the positioning table 101 can be changed by the distribution of the adhesive locations 107 between the support body 102 and the cover plate 103 so that the positioning table is deformed in a foreseeable manner during accelerations. However, then a highest possible bending strength should be maintained.

Even though these deformations lie in the nanometer region, these deformations are so critical for optical instruments, which operate at low wavelengths of especially less than 200 nm, that the deformation must be known in advance especially for an automatization of the instrument (for example, the automatization of an inspection) in order to make possible the initiation of targeted countermeasures. The deformations, however, should not be so large that these countermeasures constitute more than a very small fine correction.

A coarse adaptation of the deformation characteristic or vibration characteristic of the positioning table 101 takes place via the dimensioning of the individual parts of the positioning table 101 and especially the struts 104, joining nodes 105 and support points 106 of the lightweight structure.

A high bending stiffness is imparted to the support body 102 via the gluing of the open lightweight structure of the support body 102 to the cover plate 103.

A fine adaptation of the deformation characteristic and vibration characteristic of the positioning table 101 to the corrective values pregiven by a compensating electronic (not shown) is provided by the following: the distribution of the adhesive locations 107 on the structure of the lightweight structure, their dimensioning (that is, especially the size of the adhesive circle diameter) and the application of compensating bodies.

These corrective values cannot be stored in tables or even computed if one is to achieve a correction in real time. These corrective values are pregiven by the compensating electronic and the positioning table 101 must be adapted thereto with respect to its deformation characteristic and vibration characteristic.

Several of the adhesive locations 107 are accessible from the outside (especially on the struts 104 and the support points 106 of the lightweight structure); whereas, the adhesive locations 107 on the joining nodes 105 are completely in the interior of the joining node surfaces.

The adhesive is supplied through circular-round bores (the diameters of these bores are preferably approximately 1 to 2 mm) precisely in the center of the circular adhesive locations 107 and flows into the very tight adhesive gap (the gap having a diameter of preferably approximately 6 mm) of the adhesive location 107 via capillary action. The adhesive is prevented from leaving the adhesive gap of the adhesive location 106 by a clear cut around the adhesive location.

The formation of an air enclosure at the adhesive location 107 should be avoided during the application of the adhesive. For the adhesive locations 107 for which the clear cut does not terminate in one of the intermediate spaces of the lightweight structure, a pressure compensating channel from one of the intermediate spaces must be brought up to the clear cut for this purpose.

In FIGS. 2 to 5 one of the inner adhesive locations (5; 107) is shown on a connecting node 105. The corresponding adhesive locations 107 on the struts 104 and on the support points 106 on the lightweight structure are correspondingly configured. For these adhesive locations 107, the pressure compensating channel from one of the intermediate spaces to the clear cut can be omitted in the normal case.

An adhesive location 5 comprises a planar surface 4 having a counter surface 3 into which all cutouts needed for gluing are machined.

These cutouts are especially a flat circular-shaped adhesive pad 7 having a defined adhesive gap 8 which is surrounded by a larger circular-shaped clear cut 9 for limiting the adhesive gap 8. With this clear cut 9, the adhesive (which spreads in the adhesive gap 8 via capillary forces) can be limited to the region of this adhesive gap 8. In the adhesive pad 7, preferably in the center point thereof, a circular-shaped channel 10 ends and is provided for introducing the adhesive under overpressure. This overpressure is preferably in the range between 1 to 5 bar and is especially in the range between 3 and 4 bar. A rectangularly-shaped channel 11 connects to the clear cut 9 and is for venting the gases which develop with the curing of the adhesive.

This channel 10 for introducing the adhesive should be as short as possible so that the necessary overpressure at the introduction of the adhesive does not have to be so great. Furthermore, the necessary overpressure at the channel 10 can be reduced by applying an underpressure at channel 11.

If there is a 0.1 mm thick adhesive gap 8 having a 6 mm diameter, then the clear cut 9 should have a diameter larger by 2 mm and should be thicker than 0.5 mm. The volume ratio of the adhesive location 5 to the clear cut 9 amounts then to approximately 1:4 and there should not be a drop below a value of 1:3.

In this embodiment, the clear cut 9 is enclosed up to 69% by the joining surfaces (3, 4) because the venting channel 11 ends in the clear cut 9. The venting channel 11 is, in turn, surrounded on both sides by the connecting surfaces (3, 4) up to its exit from the two bodies (1, 2).

The rectangular-shaped channel 11 for venting the gases, which develop with the curing of the adhesive, should have double the width of the clear cut 9 and be precisely as high. However, with its dimensioning, its length should also be considered in order to ensure good venting. The channel 11 can be selected smaller when the adhesive location 5 is closer to the edge of the bodies (1, 2), which are to be joined, and should be selected larger when the adhesive location 5 is located farther within the two bodies (1, 2).

The circular-cylindrically shaped channel 10 is provided for introducing the adhesive and has, in the embodiment shown, a radius of ¼ of the radius of the adhesive pad 7. The dimensioning of the channel 10 can be selected in dependence upon the viscosity of the adhesive used and should be as short as possible.

Figure 6:
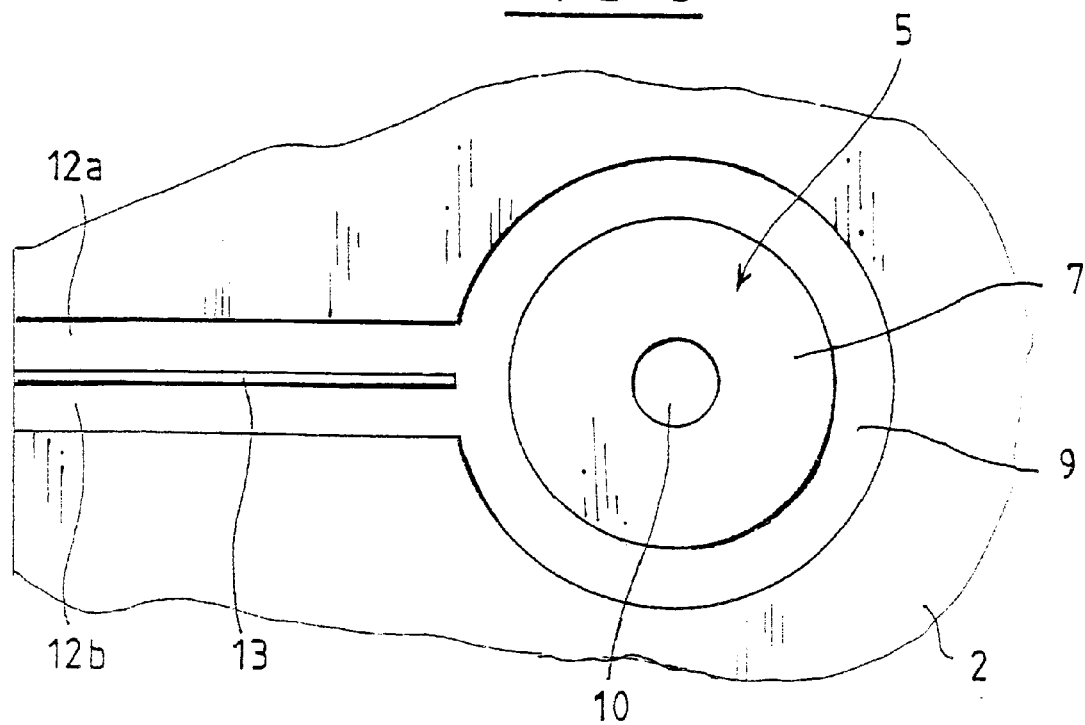
FIG. 6 is a plan view of a variation of the adhesive location shown in FIG. 4.
Figure 7:
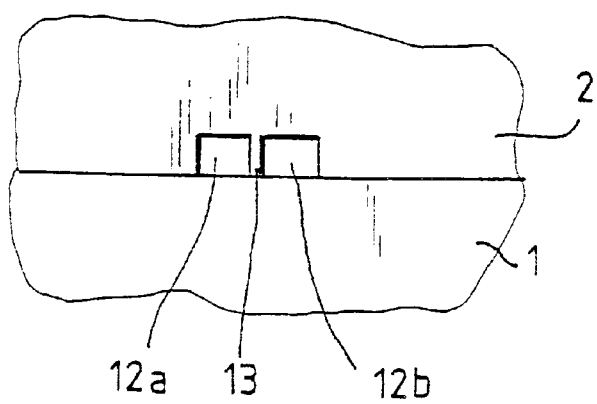
FIG. 7 is a front elevation view of the venting channel of the variation shown in FIG. 6.

The rectangularly-shaped channel 11 is for venting the gases developed with the curing of the adhesive. In order that this channel 11 not become too large when the adhesive location 5 is deep within the two bodies (1, 2) to be joined, the channel can be modified as shown in FIGS. 6 and 7.

Two channels (12a, 12b) are provided when a partition wall 13 is placed in the center of the channel 11. These two channels (12a, 12b) end in the clear cut 9. Into the one channel 12a, a gas, such as air, can be blown which can escape via the other channel 12b. In this way, a directed gas flow is generated about the adhesive pad 7 in the clear cut 9 whereby the size of the venting channel 12b can be held to acceptable limits, even when the latter is very long.

To increase the strength of the adhesive, one or both of the opposite-lying surfaces of the adhesive pad 7 can be slightly roughened. Whether this is purposeful is also dependent upon the viscosity of the adhesive used and the thickness of the adhesive gap or the width thereof because the adhesive should fill out the entire adhesive pad 7 up to the clear cut 9.

If an ultraviolet hardening adhesive is used, then it can be purposeful to mirror at least partially the walls of the venting channel (11) and of the clear cut 9 in order to bring additional ultraviolet light to the adhesive pad 7 via the venting channel (11).

It is theoretically possible to do without the channel 10 for introducing the adhesive when an adhesive is used which, after the introduction, experiences a curing (or volume increase of the adhesive, as may be required) because of external influences (for example, heating, radiation of ultraviolet light, et cetera). The actual gluing process is then triggered with a time delay. However, the metering of the quantity of the adhesive is very critical.

If there is no generation of gas from the adhesive in this process, then the channel 11 for venting the adhesive location 5 is not necessary. If no volume change occurs with the curing of the adhesive, then the channel 11 for venting the adhesive location 5 is unnecessary. If there is no volume change when the adhesive cures, then the peripherally extending clear cut 9 could be omitted.

When the two bodies (1, 2), which are to be joined, are not made of the same material, then their thermal coefficients of expansion must especially be considered when making the material selection. As already mentioned, especially ceramic or glass material are materials which are appropriate for carrying out the invention.

The placement of the adhesive pads 7 within the joining surfaces (3, 4) is important for the strength of the joint between the two bodies. The flat venting channel 11 is especially advantageous and ensures good venting. The round channel 10 is also advantageous for introducing the adhesive and counters the introduction of adhesive with the smallest possible resistance.

The round adhesive pad 7 having a channel opening in the center thereof ensures a clean flow of the adhesive as well as a tension-free adhesive location. The adhesive locations are preferably placed at the elevation of the thrust center point to minimize the deformations of the bodies to be joined.

In the above example, the recesses for carrying out the application of the adhesive are machined only on one of the contact surfaces because this is simpler from a manufacturing viewpoint. It is understood that a portion of the recesses can also be machined onto the opposite-lying contact surfaces whereby an adjusting problem would, however, result.

The transition between the second body 2 and the first body 1 (that is, the inner edge) should be precisely at right angles because the first vertically free-standing wall of the second body 2 is mirrored and serves for positioning measurements of the assembled body (1, 2).

However, it is impossible to provide an exact inner right angle on a homogeneous body from a manufacturing point of view. For this reason, the body to be produced is made of two individual bodies (1, 2) which are assembled to form a single part. The adhesive locations are described especially in FIGS. 3 to 5 where they are identified by reference numeral 5. These adhesive locations are located on the joining surfaces (3, 4). The body (1, 2) which is formed in this manner is characterized by a very high precision with respect to form while at the same time presenting a high resistance to load with respect to thrust forces.

The bodies (1, 2) described above relate to a support plate 1 for a (X, Y, Z) positioning table which is utilized in those microscopes which are utilized with radiations in the ultraviolet range for controlling the parts to be inspected. Positioning tables of this kind with their support plates 1 have to be stable with respect to form to the highest degree and simultaneously have a high strength which permits rapid movements of the table especially in an automatization of the control tasks.

The desired force reduction can be supported by an appropriate selection of the adhesive having the smallest possible shrinkage. This shrinkage should be less than 10% and preferably less than 3% and this shrinkage should preferably be even less than 1% and less than 0.6% would even be better. As an adhesive, all adhesives are suitable which exhibit a smallest possible shrinkage and which make possible a reliable adhesion to the material of the bodies to be joined. For the preferred materials (silicate and ceramic), the adhesive is especially an epoxy adhesive having a shrinkage of less than 3% or less than 0.6%.

The adhesive locations in the joining surfaces between the two bodies to be joined not only define a reliable joint of the two bodies to be joined to each other (especially for high acceleration or changes thereof) but also make possible an adjustment of the vibration characteristic of the joined body. The holding force of the adhesive locations therefore has to be especially fully effective only when the bodies, which are to be joined, want to separate at their connecting surfaces. This can take place at different degrees of rapidity depending upon the geometry of the composite body and on the position of the connecting surfaces relative to the direction or directions of acceleration.

In the embodiment shown in FIGS. 1 to 7, the clear cut can be formed in the one body and the recess for forming the adhesive location can be formed in the opposite-lying body.

This modification, however, has the disadvantage that a precise adjustment of the two bodies, which are to be joined to each other, must take place when carrying out the application of the adhesive. In special cases, this solution too can be advantageous.

The adhesive feed channel can also be led to the adhesive gap through the other body to be joined and the venting channel can be arranged in the interior of the body, far away from the joining surfaces.

With the adhesive locations shown in FIGS. 8 and 9, the influence of force (caused by the adhesive connection and the deformations resulting therefrom) can be reduced to approximately one tenth of that achieved with other joining techniques.

The connection described below is between two bodies (30, 31) and uses a stress-reducing element 37 which can also be referred to as a compensating body. This compensating body is introduced between two adhesive locations and takes up the forces in the form of stresses caused by the shrinkage of the adhesive. The adhesive connection obtained in this manner causes considerably less deformations of the finely assembled bodies (30, 31) than joining techniques known as part of the state of the art.

The physical background for the deformation caused by an adhesive connection in the assembled bodies (30, 31) lies essentially in the shrinkage of the adhesive. The change of length in one of the two adhesive connections can be described essentially with the following equation:

$$\epsilon = \delta L / L_0$$

wherein $\epsilon$ represents the expansion and $\delta L$ represents the change of length and $L_0$ represents the length before the change.

The following equation should be noted:

$$F/A = E*\epsilon$$

wherein F represents the force, A represents the adhesive surface and E represents the modulus of elasticity.

From the above, the following results:

$$F/A = E*\delta L/L_0 \rightarrow F = E*A*\delta L/L_0 \rightarrow F \sim E*A$$

If the force F and therefore the force on the adhesive location 43 is to be kept as low as possible, then the adhesive area A or the modulus of elasticity E must be reduced because $\delta L$ is pregiven by the shrinkage of the adhesive and $L_0$ is pregiven by the adhesive gaps (41, 42). The thickness of the adhesive gaps cannot be reduced down to any arbitrary amount because of the necessity of introducing the adhesive. The area A cannot be arbitrarily reduced and is fixed essentially by the required holding forces. The modulus of elasticity E is determined by the bodies (30, 31) to be adhesively joined.

In order to nonetheless reduce the force, an additional body 37 is used between the two bodies (30, 31) to be joined. The body 37 is introduced between two adhesive locations in a hollow space 34 between the bodies (30, 31) to be joined. For this body 37, the cross-sectional area and/or the modulus of elasticity can be freely selected.

FIG. 8 shows a configuration of the invention utilizing the above considerations.

The bodies (30, 31) to be joined are preferably made of the same material (for example, silicate, ceramic or Invar because of the thermal coefficients of expansion). The bodies (30, 31) have respective connecting surfaces (32, 33) at which they are glued to each other. Before the application of adhesive, a hollow space 34 is provided in one body 31 and this hollow space is open toward the connecting surface 33. The hollow space 34 can have the desired form such as that of a rectangle or cylinder. Two channels (35, 36) terminate in the hollow space 34.

The compensating element 37 is glued to the base of the hollow space 34 with a first adhesive gap 44 so that an annular air gap (40, 41) remains between the compensating element 37 and the side wall (39a, 39b) of the hollow space 34. After the compensating element 37 is glued into the hollow space 34, a first channel 35 is bored through the body 31 and through the compensating element 37. This first channel 35 later terminates in the center of the second adhesive gap 42 and the supply of adhesive for the second adhesive location on the compensating element 37 is introduced via this channel 35. A further recess is provided laterally of the air gap (40, 41) and defines a second channel 36 in the state wherein the two bodies (30, 31) are joined together.

After the two bodies (30, 31) are placed on each other, the necessary quantity of adhesive is introduced into the first channel 35 and a gas pressure is generated in the first channel 35 above the introduced adhesive. This gas pressure drives the adhesive into the second adhesive gap 42 between the compensating element 37 and the body 30. After making the second adhesive connection, no adhesive should be left in the first channel 35.

The compensating element 37 is intended to take up the tension forces. For this reason, the compensating element 37 should have a significantly lower modulus of elasticity than the bodies (30, 31) to be joined so that the reduction of forces actually takes place. The modulus of elasticity of the compensating element 37 should be less than 50% and preferably less than 10%.

The desired force reduction can be supported by an appropriate selection of the adhesive having a least possible shrinkage (in a range of less than 10% to 0.6%).

The adhesive feed channel 35 could also be introduced through the second body 30 of the bodies (30, 31) to be joined to the second adhesive gap 42 and the venting channel 36 could be arranged in the interior of the body 31, far away from the joining surfaces (32, 33).

In FIG. 9, a modification of the adhesive location 43 of FIG. 8 is shown. Here, the modification essentially concerns only the form of the compensating element 37 of FIG. 9 and the position of the adhesive feed channel 35 of FIG. 9.

As described with respect to FIG. 8, a hollow space 47 and a recess for an air outlet channel 48 are provided in one of the bodies 46 to be joined. The dimensioning of the hollow space 47 provides for a peripherally extending air gap 49 about the compensating element 50 between the latter and the side wall of the hollow space 47. The compensating element 50 is attached in the hollow space 47 by means of an adhesive which fills out the entire first adhesive gap 51. Thereafter, the two bodies (45, 46) are so put atop one another at the two opposite-lying joining surfaces (53, 54) that the adhesive feed channel 55 which is introduced into the second body 45 ends as precisely as possible in the center of the adhesive surface above the compensating element 50. The adhesive feed takes place as already described with respect to FIG. 8. The adhesive should here too fill out the adhesive gap 52 as completely as possible.

In this embodiment, the compensating element (50) serves to take up the tension and bending forces. The compensating element 50 has a peripherally extending cross-sectional reduction below the gluing plates (50a, 50b), which are used for the gluing, at the ends of the connecting strut 50c. More specifically, the strut 50c has a reduced cross section at both ends thereof as shown in FIG. 2. This reduction in cross section generates the effect, which is described with respect to FIG. 8, even when the modulus of elasticity of the material of the compensating element (50) is the same or even greater than the modulus of elasticity of the bodies (45, 46) to be joined.

However, even the forces, which occur in the connection of FIG. 8 or FIG. 9, can still be too great between the two bodies to be joined. If a force of close to zero on the bodies, which are to be joined at the adhesive location, is to be achieved, then the adhesive has to be applied laterally between the two bodies and the compensating element. FIG. 10 shows how this can be realized.

A hollow space 64, which is open upwardly, is disposed in the connecting surface 62 of the first body 60 to be joined. The hollow space 64 has the desired cross section which is preferably circular and a venting channel 66 ends in the base of this hollow space 64.

In this hollow space 64, and before the two bodies (60, 61) are joined, a longitudinally slit connecting tube (compensating element) 68 is glued in an adhesive gap 72, which is almost completely annular, so that an air gap 69 toward the base of the hollow space 64 remains especially free of adhesive and the compensating element 68 ends above the base of the hollow space 64.

Likewise, a hollow space 65, which is open upwardly, is formed in the connecting surface 63 of the second body 61, which is to be joined. The hollow space 65 has the desired cross section which is preferably circular. An adhesive feed channel 67 ends laterally approximately in the center of the adhesive location to be generated later.

This hollow space 65 has a peripherally extending slot 70 at its end lying close to the connecting surface 63. The slot 70 has a larger diameter than the rest of the hollow space 65. This slot 70 is necessary in order to stop the flow of adhesive, which is caused by capillary forces, between the connecting tube 68 and the second body 61.

The diameter of the hollow space 65 is slightly greater than the hollow space 64 in the other body 60 to be joined in order to facilitate a subsequent adjustment of the two bodies (60, 61) to each other.

After the two bodies (60, 61) are joined to each other at their connecting surfaces (62, 63), the previously determined quantity of adhesive is introduced into the adhesive channel 67 and is moved by gas pressure to the adhesive gap 71 between the connecting tube 68 and the second body 61. Here, it should be noted that the adhesive channel 67 terminates in the hollow space 65 on the side lying away from the slit 73 formed in the connecting tube 68. Here too, the connecting tube 68 ends above the base of the hollow space 65 in the second body 61 of the bodies (60, 61) to be joined so that here too an air gap 74 remains between the body 61 and the connecting tube 68. These two air gaps (69, 74) are important so that no forces can be transmitted from the connecting tube 68 to the bodies (60, 61). This objective is also achieved with the air gap 75 between the annular adhesive location 72 (between the first body 60 and the connecting tube 68) and the annular adhesive location 71 (between the second body 61 and the connecting tube 68).

Because of the slit 73 in the connecting tube 68, this tube can take up the deformations caused by the adhesive shrinkage acting laterally on the connecting tube (68) without forces being directed onto the connecting surfaces (62, 63) between the two bodies (60, 61).

In all of the drawings presented in the figures, it should be considered that the correct size relationships are not shown here. Especially, all adhesive gaps are much smaller than shown because the adhesive is intended to flow into these adhesive gaps via capillary force and an adhesive gap should therefore have a width that does not exceed a few tenths of a millimeter.

The adhesive feed channel should preferably be as free of adhesive as possible after carrying out the gluing.

The adhesive locations in the wringing surfaces between the two bodies to be joined serve to join the two bodies to each other especially for intense accelerations or changes thereof. The holding forces of these bodies must therefore especially then be fully effective when the bodies, which are to be joined, want to separate from each other at the joining surfaces. This can take place with different rapidity depending upon the geometry of the joined body and the position of the connecting surfaces relative to the direction or directions of acceleration. The connecting surfaces can additionally be joined to each other via wringing.

In FIGS. 8 and 9, the hollow space for accommodating the compensating element does not have to be configured in only one of the two bodies. It is equally effective to provide two hollow spaces lying opposite each other as precisely as possible. This modification, however, presents the disadvantage that a more precise adjustment of the two bodies, which are to be joined, to each other must take place when gluing. However, in special cases, this solution can be advantageous.

Parts of the surface of the composite body can be mirrored for position measurements.

Further possibilities for finely tuning the vibration characteristic of the composite body result from the possibility of introducing additional weight bodies on the structure of the support body (especially on the struts) as well as the removal of material from the structure of the support body perpendicular to the cover plate.

The support body and the cover plate are preferably made of the same material for reasons of thermal stability. Each of the two bodies has at least one joining surface which lie opposite each other. One or several recesses for the adhesive location or adhesive gap are introduced on at least one of the two joining surfaces. An adhesive provides for an adhesive connection of the two joining surfaces at the one or more adhesive locations between the two bodies.

The two bodies can be wrung to each other outside of the adhesive locations. The adhesive locations do not have to lie completely within the wringing surface. For a wringing of the two bodies to each other, a wringing surface can be closed by an additional adhesive channel which can be arranged on the two bodies preferably about the edge of the wringing surfaces or in a slot between the two bodies on the wringing surfaces. Furthermore, the wringing surfaces should enclose the adhesive locations as completely as possible at least, however, more than 50% and preferably more than 60% and still preferably more than 65%.

A first channel can be provided for introducing the adhesive into the adhesive location and should preferably be circularly shaped.

A second channel can provide an air connection up to the adhesive location which is to be glued and in this way take care of venting the adhesive location. This second channel is preferably rectangularly shaped. The second channel is purposefully guided up to the clear cut about the adhesive region. The second channel and the clear cut preferably have a thickness of at least three times (preferably a thickness of a multiple of five) of the inner adhesive region and the second channel and the clear cut have the same thickness.

The point-shaped adhesive location(s) should be arranged on the support body at discrete locations and should be placed at the elevation of the thrust center point of the two bodies. Also, the adhesive locations preferably have an inner circular-cylindrically shaped adhesive region and an external circular-cylindrically shaped clear cut should surround this inner adhesive region in order to prevent the adhesive from leaving the adhesive location.

The positioning table according to the invention essentially comprises a support body and a cover plate. The support body can be assembled of various support bodies or it can be machined from one part (homogeneous body).

The support body can have the most different configuration optimized in accordance with the application, for example, the support body can be made of closed or open multi-cornered bodies (bodies having three-cornered surfaces, four-cornered surfaces, five-cornered surfaces, six-cornered surfaces and n-cornered surfaces). The support body can have a configuration such as an atom (connecting nodes (for example, spheres, cubes, et cetera) having connecting struts (round or multi-cornered)).

The positioning table can be open laterally or from below or the positioning table can be closed and the cover plate can be attached at any side of the support body (that is, not necessarily on top).

The material of the support body can comprise only a single material or different materials can be used for assembling the support body. The support body has a plurality of recesses (lightweight structure) in order to make the support body lighter.

A separately produced cover plate is attached to the support body of the positioning table. This cover plate is assembled either of several parts or is a homogeneous part. The material of the cover plate can be a single material or different materials can be used for its manufacture.

The thermal coefficient of expansion of the materials of the support body and the cover plate should be as low as possible and maximally differ by $2*10^{-6}$ mm/K in order to obtain the smallest possible dimensional change of the positioning table for temperature changes. This difference of the thermal coefficient of expansion of the materials of the support body and the cover plate tend toward zero when one manufactures both of the same material. Especially Invar, glass or ceramic and especially glass ceramic are materials suitable for the support body and the cover plate.

Several attachment locations can be arranged between the support body and the cover plate which are separated spatially from each other. In this way, one facilitates the adjustment of the vibration characteristic of the positioning table whereby the positioning table can be utilized in the most different apparatus. Furthermore, one permits the electronics specialist to develop the positioning electronics independently of the positioning table. More specifically, the electronic specialist can avoid critical resonance locations.

The maximum expansion to at least 50% of the attachment locations should be less than 12 mm in order to at least approximately obtain a point-shaped attachment of the cover plate to the support body. This point-shaped attachment especially permits an optimal adaptation of the vibration characteristic of the positioning table to the use spectrum and permits manufacturing fluctuations for the individual component production to be compensated via a judicious positioning of the attachment points to each other.

The attachment of the cover plate to the support body can be achieved with adhesive, soldering, welding, wringing or a combination of these attachment techniques depending upon the materials used and the required profile. For example, the adhesive technique and, if required, in combination with wringing is suitable for glass ceramic; whereas, for the use of Invar as a material, for example, of the positioning table, adhesive, soldering, welding or a combination of these attachment techniques can be used.

The thickness of the cover plate should be so dimensioned that it can take up the stresses of the support body. The thickness of the support body should, however, be as small as possible in order to be able to make the positioning table as light as possible and therefore make the shifting dynamic as great as possible. This is especially achieved for larger positioning tables when the thickness of the cover plate is less than 2 mm and greater than 0.5 mm.

An advantageous lightweight structure for the support body is obtained when the support body is built up of two-dimensionally or three-dimensionally arranged connecting nodes and spokes. The cross sections of the spokes are less than the cross sections of the connecting nodes. With appropriate computation methods, the desired parameters can be simulated very precisely on a computer because complete programs can be purchased for this purpose.

The support body should have recesses below the cover plate for accommodating the adjusting elements so that the overall dimensions of the table can be held as small as possible.

If an opening is arranged in the center of the support body, this facilitates the use of manipulators and in optical apparatus wherein trans-illuminated viewing takes place.

Adhesive locations can be arranged between the support body and the cover plate because these adhesive locations cause a minimal deformation during assembly at the bodies, which are to be joined and can be configured to be thermally very stable (slight deformations for temperature changes). These adhesive locations should have a round form in order to come as close as possible to the ideal point-shaped connection.

The positioning table can, for example, be built into optical apparatus which operate at a wavelength of less than 400 nm. The form stability of the positioning table lies in the nanometer range (that is, less than 100 nm down to 10 nm) for a professional configuration. For this reason, especially components having very small structures in an optical apparatus can be supported very precisely with the positioning table.

One or several lenses and/or one or several reflecting elements are arranged in optical instruments of this kind. Exemplary for an optical apparatus of this kind is a microscope which preferably operates with electromagnetic waves in the ultraviolet range.

It is understood that the foregoing description is that of the preferred embodiments of the invention and that various changes and modifications may be made thereto without departing from the spirit and scope of the invention as defined in the appended claims.

What is claimed is:

1. A structure comprising:
   a cover body having a plate-like shape;
   a support body of open light-weight structure composed of struts, connecting nodes and support points;
   a plurality of attachment locations spatially separated one from the other; and,
   said cover body and said support body being bonded at said locations.

2. The structure of claim 1, wherein a first material of said support body has a first thermal coefficient of expansion and a second material of said cover body has a second thermal coefficient of expansion; and, said first and second coefficients of expansion differ from each other by not more than a maximum of $2*10^{-6}$ mm/K.

3. The structure of claim 2, said support body and said cover plate conjointly defining an interface; and, said positioning table further comprising a plurality of attachment locations at said interface spatially separated one from the other.

4. The structure of claim 3, wherein a maximum extension at at least 50% of said attachment locations is less than 12 mm.

5. The structure of claim 4, wherein said cover plate has a thickness of at most 2 mm and a latitude exceeding 10 cm.

6. The structure of claim 1, said support body having recesses being formed below said cover plate for accommodating adjusting elements therein.

7. The structure of claim 1, wherein said cover plate is attached to said support body by at least one of the following: gluing, soldering, welding and wringing or a combination thereof.

8. The structure of claim 1, said support body and said cover plate conjointly defining an interface; and, said positioning table further comprising a plurality of adhesive locations at said interface; and, each of said adhesive locations being circular.

9. The structure of claim 1, wherein said support body and said cover plate are both made of the same material.

10. The structure of claim 1, wherein said support body and said cover plate are made of one of the following materials: glass, ceramic or glass ceramic.

11. A positioning table comprising:

a support body made of at least a first material;

said support body having a plurality of recesses therein;

a cover plate attached to said support body and being made of a second material;

said support body being configured to include a plurality of two-dimensionally or three-dimensionally arranged connecting nodes and spokes;

each of said nodes having a cross section and each of said spokes having a cross section; and, the cross sections of said spokes being less than the cross sections of said connecting nodes.

\* \* \* \* \*

UNITED STATES PATENT AND TRADEMARK OFFICE
CERTIFICATE OF CORRECTION

PATENT NO. : 6,111,691
DATED : August 29, 2000
INVENTOR(S) : Michael Trunz and Bernhard Trier It is certified that error appears in the above-identified patent and that said Letters Patent is hereby corrected as shown below:

Column 12,
Lines 56 and 57, delete "positioning table" and substitute -- structure -- therefor.

Column 13,
Lines 6 and 7, delete "positioning table" and substitute -- structure -- therefor.

Signed and Sealed this

Thirteenth Day of November, 2001

Attest:

NICHOLAS P. GODICI
Attesting Officer
Acting Director of the United States Patent and Trademark Office